United States Patent [19]
Wais et al.

[11] 3,769,939
[45] Nov. 6, 1973

[54] RESTRAINING AND TRAINING HARNESSING DEVICE

[75] Inventors: Lowell Wais; Charles C. Milbourne, both of Chicago, Ill.

[73] Assignee: Harnex Inc., Chicago, Ill.

[22] Filed: Aug. 4, 1971

[21] Appl. No.: 168,805

Related U.S. Application Data
[63] Continuation-in-part of Ser. No. 107,236, Jan. 18, 1971, abandoned.

[52] U.S. Cl. .............................................. 119/106
[51] Int. Cl. ............................................ A01k 03/00
[58] Field of Search ..................... 119/96, 106, 109, 119/126; 54/71

[56] References Cited
UNITED STATES PATENTS

| | | | |
|---|---|---|---|
| 626,317 | 6/1899 | Brown | 54/71 |
| 376,872 | 1/1888 | Freeman | 54/71 |
| 2,026,383 | 12/1935 | Gyulay | 119/96 |
| 2,670,712 | 3/1954 | Patience et al. | 54/71 |

Primary Examiner—Hugh R. Chamblee
Attorney—Merriam, Marshall et al.

[57] ABSTRACT

Restraining and training harnessing devices for pet animals, such as dogs, comprising one or more segments of flexible cord adapted for positioning in a cross-wise pattern across the animal's chest with cord portions extending along the animal's nech on both sides thereof and through one or more collar rings. The devices are provided with loop elements, associated with the cord, for encircling the upper portions of the animal's forelegs. Operatively, pulling forces applied on the harnessing device tend to draw the forelegs together and effect temporary inhibition of further attempts at movement of the animal.

13 Claims, 13 Drawing Figures

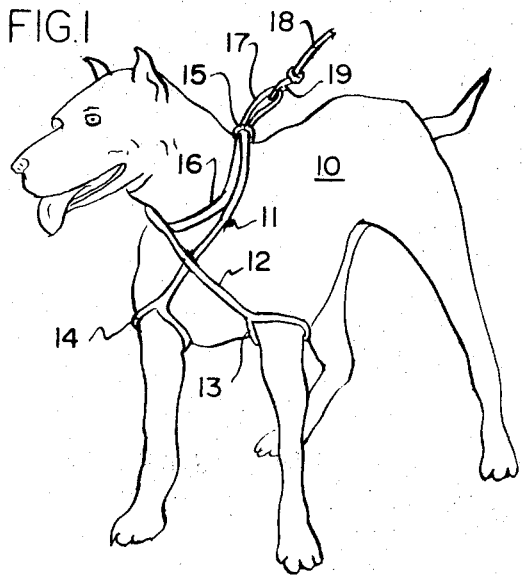
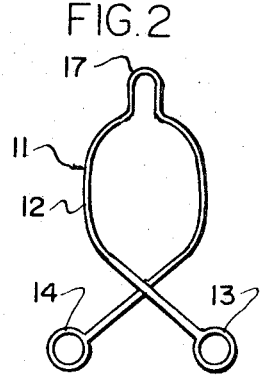
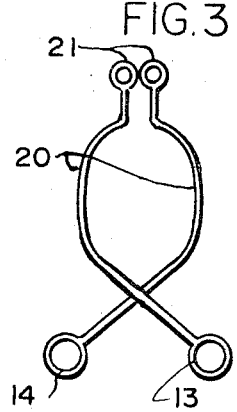
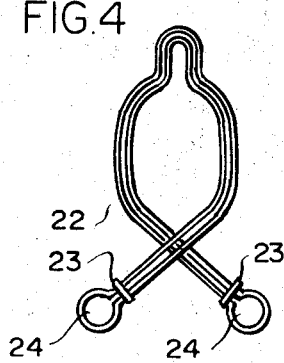
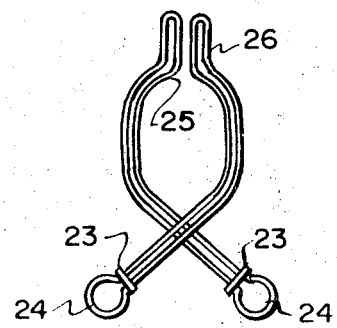
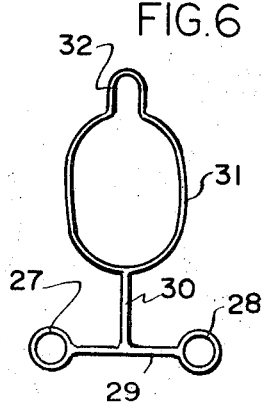
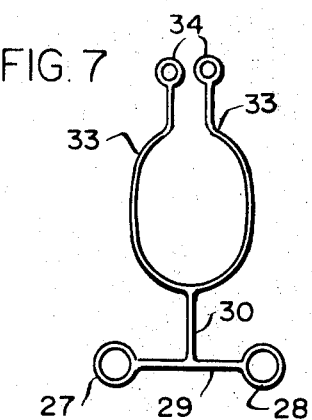
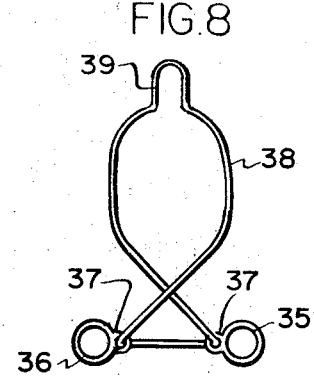
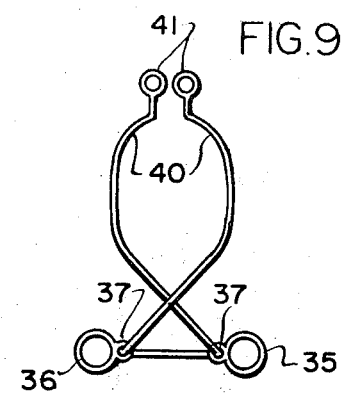

PATENTED NOV 6 1973 3,769,939
SHEET 2 OF 2
FIG. 10 FIG. 11 FIG. 12
FIG. 13
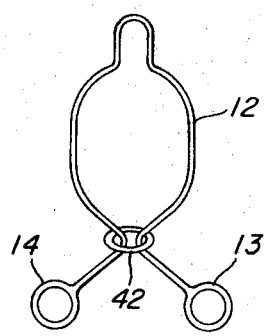
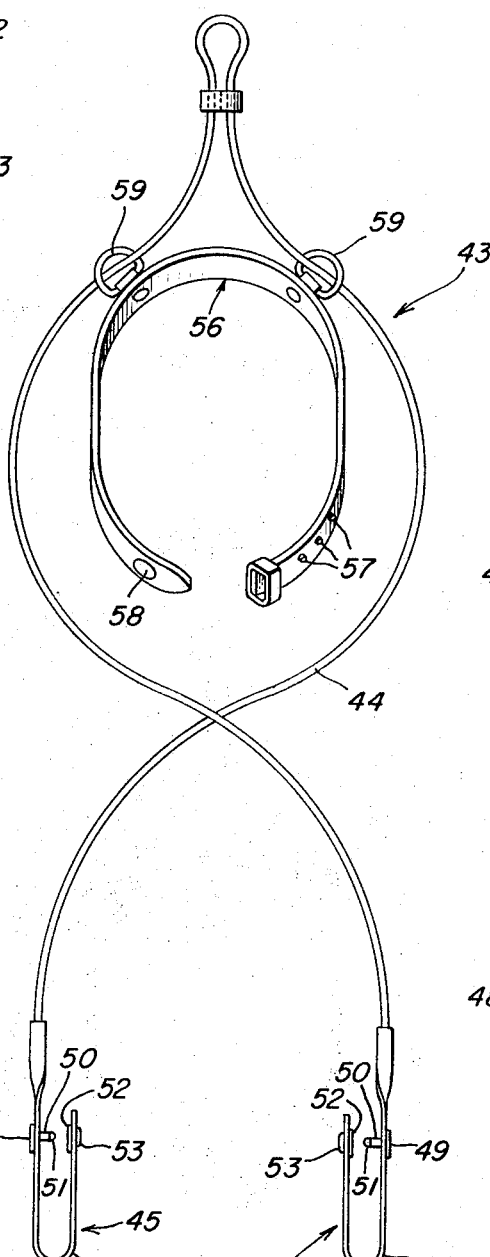
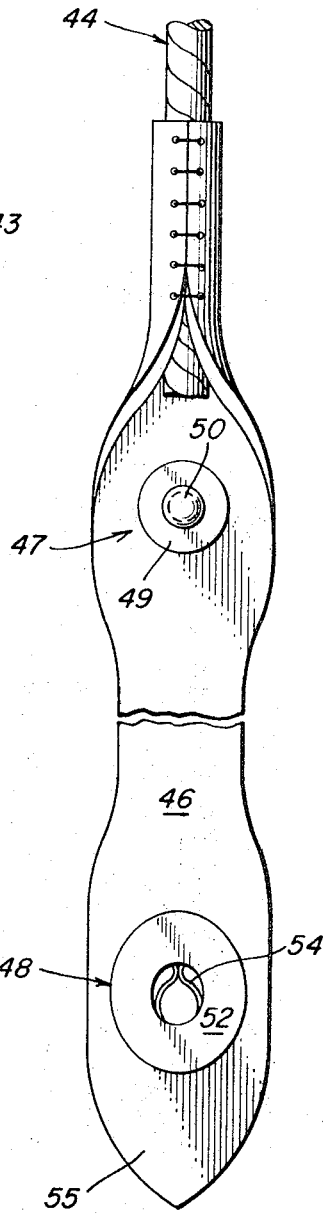
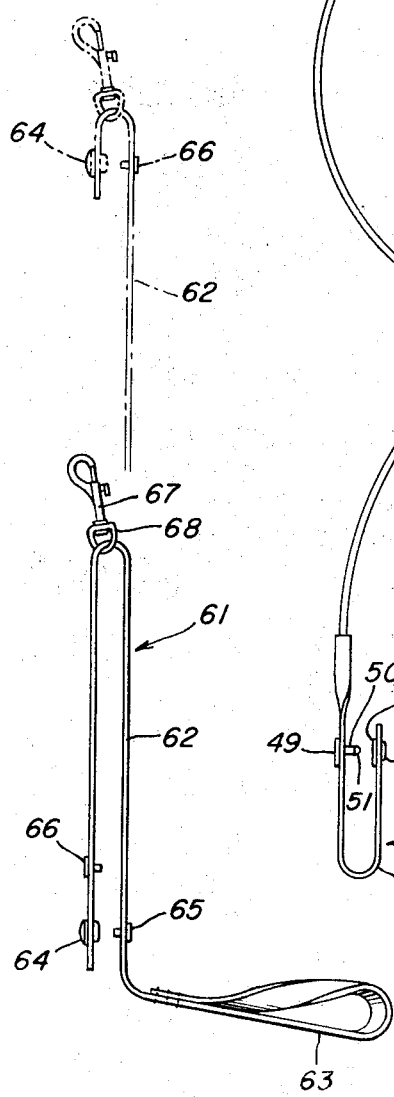
INVENTORS
CHARLES C. MILBOURNE
LOWELL WAIS
BY
Merriam, Marshall,
Shapiro & Klose
ATTYS.

RESTRAINING AND TRAINING HARNESSING DEVICE

CROSS-REFERENCE TO RELATED APPLICATION

This application is a continuation-in-part of our co-pending application Ser. No. 107,236, filed Jan. 18, 1971 now abandoned.

BACKGROUND OF THE INVENTION

This invention relates generally to improvements in control devices for pets such as dogs and more particularly to harnessing devices for governing the forward movement of dogs and for training dogs to avoid bolting and sustained pulling while being walked.

Devices presently employed for governing the tendencies of a dog to pull and bolt forward while being walked include leash and collar combinations as well as standard body harnesses.

Conventional leash and collar combinations ordinarily incorporate collars of two types: the relatively fixed diameter "belt" type, and the variable diameter "choke" type. The basic method of operation of both types of collars is the translation of a pulling force on the leash into a choking action about the animal's neck. The major difference between the collar type is that the "belt" type ordinarily effects a less severe mode of choking than the "choke" type.

The use of such collars is ordinarily thought to be necessary to restrain the dog and to train it to avoid bolting and sustained pulling while being walked. It is believed that one of the most effective methods of causing a dog to cease a bolting or pulling movement is to choke it to the point where it will cease such movement. Such repeated choking of the dog as it bolts and pulls supposedly will eventually condition the animal to avoid the physical punishment of choking by avoiding the bolting and pulling which give rise to choking.

It is widely recognized, however, that such collar and leash combinations have limited effectiveness as training devices and restraining means.

As training devices they are inefficient, inhumane and always potentially harmful to the animal. They inflict extensive physical abuse and pain upon a dog in a process for conditioning it to avoid undesirable behavior. In such a conditioning process, if the bolting and pulling is strenuous and the trainer is steadfast in maintaining the leash in a fixed position, the choking is proportionally quite pronounced. If the pulling is less strenuous or the trainer inconsistantly allows forward movement in response to the pull, the choking is proportionally less pronounced.

The animal is consequently not trained to avoid all bolting and pulling but only that which results in an intolerable degree of discomfort. Thus, dogs commonly continue to bolt and pull to a great degree even after extensive exposure to and training with such leash and collar combinations. The degree of continued pulling is generally dependant upon the dog's ability to withstand varying degrees of choking and upon the trainer's consistancy in withstanding the pull of the dog to thereby sustain the choking action of the collar.

The potential harm caused by the use of such devices is manifest, especially in those instances in which a "choke" type collar is used on youthful, exuberant dogs.

Such collar leash combinations are similarly inefficient as restraining devices because the animal's legs are at all times free to sustain a pulling movement even while it is being choked. This often results in excessive strain on the person holding the leash.

Standard body harnesses also have an equally limited utility as restraining and training devices. While they are ordinarily more humane, in that they inflict little or no pain on the harnessed animals, their utility again depends to a great extent upon the leash-holder's ability to withstand the unimpaired, continued pulling by the animal, and little conditioning to avoid pulling is effected.

SUMMARY OF THE INVENTION

The harnessing devices of the present invention provide a humane and efficient means for restraining dogs and training them to avoid bolting and sustained pulling.

Generally stated, embodiments of the harnessing devices of the invention include one or more segments of flexible cord for positioning in a cross-wise pattern across a dog's chest with portions extending along the animal's neck on both sides thereof and through one or more collar rings. The devices are provided with loop structures to encircle the upper portions of the dog's forelegs.

The subject harnessing devices operate to translate forces, generated by bolting or pulling movements of the animal and/or restraining movements of the trainer (hereinafter referred to as "pulling forces"), into forces on the flexible cord which simultaneously tend to draw the loop-encircled forelegs of the dog toward each other and effectively preclude continued bolting, pulling or forward movement. Once the forelegs are drawn toward each other (i.e., the right foreleg drawn toward the left and viceversa), the dog is substantially disabled from moving in a normal fashion, and the trainer or walker is not subjected to continued or increasing strain.

Because the subject devices temporarily incapacitate the animal without causing pain, they permit a training procedure which is exceptionally uniform and consistent and therefore exceptionally efficient. The animal is conditioned to avoid behavior which results in consistent frustrating incapacitation.

Further aspects and advantages of the present invention will be apparent from the following description of preferred embodiments thereof, reference being made to the following drawings.

BRIEF DESCRIPTION OF THE DRAWINGS

FIG. 1 illustrates an animal wearing an embodiment of the training and restraining harnessing devices of the invention;

FIG. 2 shows the device of FIG. 1;

FIG. 3 shows an alternative embodiment of the device of FIG. 2;

FIGS. 4 – 10 show further alternative embodiments of the devices of the invention.

FIG. 11 shows an alternative embodiment of the device of FIG. 1 in combination with a variable diemater collar having two ring structures.

FIG. 12 is a fragmentary plan view of a loop-forming element of the device shown in FIG. 11.

FIG. 13 is a schematic view of a variable length leash for use with the devices of the invention.

DESCRIPTION OF THE PREFERRED EMBODIMENTS

Referring to FIG. 1, a dog 10 wears a harnessing device indicated generally at 11 and constructed according to an embodiment of the present invention. As shown more clearly in FIG. 2, harnessing device 11 comprises a single segment of cord 12 having loop elements 13, 14 for encircling the upper portions of the forelegs of the dog.

Cord 12 is preferably of a smooth, flexible material such as woven plastic. Such a construction facilitates the forming of looped portions. Loop elements 13, 14, which encircle the forelegs, may be integrally formed of the same cord material, as shown, or may be of separate construction, appropriately fastened to cord 12.

As illustrated in FIG. 1, cord 12 extends loop 13 on the dog's left foreleg, diagonally across the chest, along the right side of the dog's neck, through a ring 15 of a dog collar 16 at the back of the dog's neck then turned back at bight 17 in a reverse direction through ring 15, along the left side of the dog's neck and across the chest to loop 14 on the right foreleg.

Device 11 may be used with a conventional leash 18 having a fastener 19 for securing leash 18 to cord 12 at bight 17 behind ring 15. Alternatively, if cord 12 is of sufficient length, no leash need be employed.

In use, pulling forces, initiated by the person holding the leash or by the dog, will eliminate any slack in the leash and harness and result in the forelegs of the dog being drawn toward each other as described previously. This literally stops the animal in its tracks since the forelegs can no longer participate in the initiation of the forward or backward movement by the dog.

FIG. 3 illustrates an embodiment of a harnessing device whch may be positioned like device 11 of FIG. 1 and 2, but which includes two cord segments 20, 20, each having a terminal fastening element 21, 21 for attachment to a leash.

FIG. 4 illustrates a double-stranded harnessing device fashioned from a single endless cord 22. Closure elements, such as rings 23, 23 function to form looped portions 24, 24 of cord 22 for encircling the dog's forelegs.

FIG. 5 shows a double-stranded device fashioned from two endless cords 25, 26. The device of FIG. 5 is otherwise identical to that of FIG. 4.

FIG. 6 illustrates a multi-segmented harnessing device including a pair of loop elements 27, 28 connected by a cord segment 29 and a cord segment 30 interconnecting cord segment 29 with an endless cord loop 31. Loop 31 fits about the dog's neck with a bight portion 32 extending through a collar ring. FIG. 7 shows a similar multi-segmented embodiment, but instead of a bight portion 32, there are two cord segment 33, 33, each of which has a terminal fastening element 34, 34.

FIG. 8 illustrates an embodiment having loop elements 35, 36 each provided with a respective slip ring element 37, 37. An endless cord 38 extends through both ring elements 37, 37 and encircles the dog's chest and neck in a cross-wise pattern. Ring elements 37, 37 encircle and retain cord 38. Cord 38 includes a bight portion 39 for passing through a collar ring. FIG. 9 shows a similar embodiment, but instead of a bight portion 39 there are two cord segments 40, 40 having terminal fastener elements 41, 41.

FIG. 10 shows an embodiment similar to that of FIG. 2 in which cord 12 does not extend fully diagonally across the animal's chest but passes through a ring 42 midway across the chest and then back around the neck of the animal on the same side as the loop from which it originates.

FIG. 11 illustrates a restraining and training harnessing device 43 having a cord 44 with loop-forming elements 45, 45 fastened thereto. In the embodiment shown, loop-forming elements 45, 45 include straps 46, preferably of leather or plastic material, fastened by stitching to cord 44. Each strap 46 is provided with a post member 47 affixed on the strap near the point of attachment of the strap to cord 44 and a socket member 48 near the opposite end.

Operation of loop-forming elements 45, 45 may be best understood in reference to FIG. 12 which shows post member 47 and socket member 48 in greater detail. Post member 47 includes a metal base plate element 49, fastened to strap 46. Projecting from base element 49 is a cylindrical shaft element 50 having a cutaway portion in the form of a circumferential groove 51. Socket member 48 includes donut-shaped metal base elements 52, 53 affixed to strap 46 on opposite sides of a perforation (not shown) in the strap, and retaining between them a metal spring clip element 54.

When a loop about the animal's foreleg is to be formed with loop-forming element 45, the end of strap 46 bearing socket member 48 is brought around the leg to post member 47. Shaft 50 is disposed into socket member 48 and spring clip 54 is urged over shaft 50 until the clip engages into shaft groove 51, securing shaft 50 in socket member 48.

Spring clip element 54 is preferably of the design type permitting only unidirectional unfastening of socket member 48 from shaft 50. In this respect, spring clip 54 is preferably of a wishbone shape and engages shaft 50 in a manner allowing the clip to be easily disengaged from shaft 50 when lifting pressure is applied at the tip 55 of strap 46 (pulling the opened end of the wishbone shaped clip over the shaft), but inhibiting disengagement when lifting pressure is applied elsewhere along strap 46.

Collar 56 is of a variable diameter type, having post members 57 and socket member 58 similar in construction and operation to the post and socket members of loop-forming elements 45, 45. Spaced-apart rings 59, 59 through which cord 43 may be passed are provided at fixed positions on collar 56. When collar 56 is placed about the animal's neck, rings 59, 59 will ordinarily be positioned at or near the back portion of the neck. It may be seen that collar 56 is so designed as to permit alteration of its diameter without variation in the relative positions of rings 59, 59 with respect to the animal's neck.

FIG. 13 shows a variable length leash 61 for use with the devices of the invention. Leash 61 includes strap 62 of leather or plastic material which has the hand grip portion 63 formed from a half twist of strap 62. It may be noted that such a configuration for hand grip portion 63 facilitates its comfortable and secure positioning in the hand of the person holding it. Strap 62 is further provided with a socket member 64 near the end opposite hand grip portion 63 and at least two post members 65, 66 intermediate socket member 64 and hand grip portion 63. Socket member 64 and post members 65, 66 are similar in construction and operation to post and socket members of loop-forming elements 45, 45. Also provided is slidable clipping member 67, including ring element 68 which may slide freely along the length of strap 62.

In operation, leash 61 may be employed in a shortened form by fastening socket member 64 to post member 65 which is positioned adjacent hand grip portion 63, clipping member 67 being disposed along strap 62 intermediate socket member 64 and post member 65. Alternately, leash 61 may be employed in a lengthened form (shown in phantom lines) by fastening socket member 64 to post member 66, clipping member being disposed along strap 62 intermediate socket member 64 and member 66.

Obviously, modifications and variations of the above - described invention may be made without departing from the spirit and scope thereof. Therefore, only such limitations as are indicated in the appended claims shall be placed thereon.

What is claimed is:

1. A harnessing device for use in the training and restraining of pet animals such as dogs, and for use with a collar having a ring element located at the back of the animal's neck, comprising:
    a pair of loop means for encircling the right and left forelegs of such an animal; and
    flexible cord means for harnessing the animal;
    said cord means comprising means connected to each of said loop means, for extending across the animal's chest, around the back of the animal's neck and through the ring of said collar, whereby pulling forces on said cord means may function to draw the animal's forelegs toward each other.

2. The harnessing device of claim 1 wherein said loop means are integrally formed from portions of said cord means.

3. The harnessing device of claim 1 wherein said cord means are of a woven plastic construction.

4. The harnessing device of claim 1 wherein said cord means for extending through said collar ring includes fastening means for connection to a leash.

5. The harnessing device of claim 1 wherein said loop means include attached slip ring means for encircling and retaining said cord means.

6. Apparatus for harnessing a dog, said apparatus comprising, in combination:
    a collar having a ring means for positioning at the back of the dog's neck;
    a first loop means for encircling the upper portion of the right foreleg of the dog;
    a second loop means for encircling the upper portion of the left foreleg of the dog; and,
    a flexible cord connected to each of said loop means and comprising means for extending from said first loop means, along the left side of the dog's neck and through said collar ring means, then in reverse direction through said collar ring means, along the right side of the dog's neck and to said second loop means, whereby pulling forces on said cord may function to draw the dog's forelegs toward each other.

7. A harnessing device for use in the training and restraining of pet animals such as dogs, and for use with a collar having a pair of spaced-apart ring elements located respectively at the right and left sides of the back of the animal's neck, said harnessing device comprising:
    a pair of loop-forming means forming loops to encircle the right and left forelegs of such an animal;
    flexible cord means for harnessing the animal;
    said cord means comprising a pair of means, each connected to and terminating at a respective one of said loop-forming means and each extending across the animal's chest directly from the loop-forming means at which it terminates, then around the back of the animal's neck and through the rings of said collar, whereby pulling forces on said cord means may function to draw the animal's forelegs toward each other.

8. The harnessing device of claim 7 wherein said loop-forming means comprise a strap having unidirectionally unfastenable means for forming a loop from said strap.

9. The harnessing device of claim 8 wherein said fastening means comprise fastenable post and socket fastening means.

10. The harnessing device of claim 7 wherein said means for extending through said collar rings includes fastening means for connection to a leash.

11. Apparatus for harnessing a dog, said apparatus comprising, in combination:
    a collar having first and second ring means for positioning respectively at right and left sides of the back of the dog's neck;
    a first loop means for encircling the upper portion of the right foreleg of the dog;
    a second loop means for encircling the upper portion of the left foreleg of the dog; and,
    a flexible cord having a pair of ends each terminating at and connected with a respective one of said loop means and comprising means extending directly from the termination at said first loop means, along the left side of the dog's neck and through said second collar ring means, then in reverse direction through said first collar ring means, along the right side of the dog's neck and directly to the termination at said second loop means, whereby pulling forces on said cord may function to draw the dog's forelegs toward each other.

12. A harnessing device as recited in claim 7 wherein said flexible cord means constitutes the sole connection between said collar and said loop-forming means.

13. A harnessing device as recited in claim 11 wherein said flexible cord constitutes the sole connection between said collar and said loop-forming means.

* * * * *